(12) United States Patent
Vaselaar

(10) Patent No.: US 9,855,570 B1
(45) Date of Patent: Jan. 2, 2018

(54) MIST BLOWER

(71) Applicant: Cory A. Vaselaar, Sheldon, IA (US)

(72) Inventor: Cory A. Vaselaar, Sheldon, IA (US)

(73) Assignee: BROYHILL, INC., Dakota City, NE (US)

( * ) Notice: Subject to any disclaimer, the term of this patent is extended or adjusted under 35 U.S.C. 154(b) by 0 days.

(21) Appl. No.: 15/164,149

(22) Filed: May 25, 2016

(51) Int. Cl.
| | |
|---|---|
| *A01M 7/00* | (2006.01) |
| *B05B 7/00* | (2006.01) |
| *F04D 17/16* | (2006.01) |
| *F04D 29/42* | (2006.01) |
| *F04D 29/70* | (2006.01) |
| *A01K 13/00* | (2006.01) |
| *A01G 17/02* | (2006.01) |
| *A01M 21/04* | (2006.01) |
| *B01F 3/04* | (2006.01) |

(52) U.S. Cl.
CPC ............ *B05B 7/0075* (2013.01); *A01G 17/02* (2013.01); *A01K 13/003* (2013.01); *A01M 21/043* (2013.01); *B01F 3/04063* (2013.01); *F04D 17/16* (2013.01); *F04D 29/422* (2013.01); *F04D 29/705* (2013.01); *B01F 2215/0009* (2013.01)

(58) Field of Classification Search
CPC .................................................. A01M 7/0014
USPC ...................................................... 239/77, 561
See application file for complete search history.

(56) References Cited

U.S. PATENT DOCUMENTS

| | | | |
|---|---|---|---|
| 2,661,239 A | 12/1953 | Tirrell | |
| 3,339,846 A | 9/1967 | Guetet | |
| 3,625,426 A | 12/1971 | Swanson | |
| 3,980,232 A * | 9/1976 | Funk ................... | A01M 7/0014 239/561 |
| 4,599,042 A | 7/1986 | Colliver | |
| 4,823,268 A * | 4/1989 | Giles ................... | A01M 7/0089 239/77 |

* cited by examiner

*Primary Examiner* — Arthur O Hall
*Assistant Examiner* — Tuongminh Pham
(74) *Attorney, Agent, or Firm* — Dennis L. Thomte; Thomte Patent Law Office LLC

(57) ABSTRACT

A mist blower for blowing chemicals, such as pesticides, onto objects. The mist blower includes a powered centrifugal blower having a rectangular-shaped air discharge opening formed in the blower housing thereof. A plurality of air discharge tubes have their lower ends in communication with the air discharge opening. The tubes are preferably radially spaced from one another. Spray nozzles are positioned in each of the air discharge tubes for mixing the chemicals with the air being blown through the discharge tubes. The blower housing may be rotated so that air discharge tubes may direct misted air in different directions from the blower.

2 Claims, 8 Drawing Sheets

MIST BLOWER

BACKGROUND OF THE INVENTION

Field of the Invention

This invention relates to a mist blower for applying insecticides, herbicides, pesticides, etc., onto objects. More particularly, this invention relates to a mist blower which has a plurality of individual air discharge tubes which have their inner ends in communication with the air discharge opening of the blower housing. Even more particularly, the mist blower of this invention relates to a mist blower which is especially adapted for use in orchards such as pecan tree orchards. Further, in the preferred embodiment, the air discharge tubes are radially offset from one another to increase the overall direction of the mist being discharged from the blower.

Description of the Related Art

Many types of mist blowers have been previously provided. For example, the Assignee of this invention, Broyhill Co., has been marketing a mist blower for some time under the trademark "G Force". In Assignee's prior art device, a centrifugal fan blower is mounted on a frame which may be secured to a three-point hitch of a tractor so that the blower may be powered by the PTO of the tractor. Assignee's prior art mist blowers could also be mounted on a trailer and powered by an engine. Further, Assignee's prior art mist blowers could also be mounted on an ATV, UTV, etc. In Assignee's prior art devices, and many other devices of the prior art, the blower included a centrifugal fan mounted on a frame with the centrifugal fan having an air inlet opening and an air discharge opening. An air discharge housing was connected to the blower and the discharge opening of the blower for discharging mist from the blower. In the prior art devices, the blower could be rotated through an arc whereby mist could be selectively sprayed from either side of the blower.

However, the mist output of the prior art blowers could not be directed simultaneously to both sides of the unit. Thus, if two rows of trees were to be sprayed, the blower would have to be moved along the lengths of the trees in two passes, one for one row of trees and another for the other row of trees. Further, especially in pecan tree orchards, the canopies of the trees in one row may intermingle with the canopies in the adjacent row of trees. The prior art mist blowers were unable to spray the intermingled canopies between the rows and the two rows in one pass but would require three or more passes.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A mist blower is disclosed for spraying insecticides, pesticides, herbicides, etc., onto objects such as cattle, orchards, weed patches in ditches, etc. The mist blower of this invention includes a mobile frame having forward and rearward upstanding and horizontally spaced-apart support frames having upper ends. A centrifugal blower is mounted on the upper ends of the forward and rearward support frames with the blower including a blower housing having a forward end, a rearward end, and a circular side wall. The blower housing is horizontally disposed between the forward and rearward frames. The blower housing may be rotated from side to side. The side wall of the blower housing has a horizontally extending and rectangular-shaped air discharge opening formed therein. An air discharge tube assembly is secured to the side wall of the blower housing so as to extend around the air discharge opening thereof. The air discharge tube assembly includes an elongated and rectangular-shaped first air discharge tube having an open lower end, an open upper end, a forward wall, a rearward wall, a first side wall, and a second side wall. The first air discharge tube extends vertically upwardly from the air discharge opening. The air discharge tube assembly also includes an elongated and rectangular-shaped second air discharge tube having an open lower end, an open upper end, a forward wall, a rearward wall, a first side wall and a second side wall which is positioned rearwardly of the first air discharge tube. The second air discharge tube extends upwardly and laterally from the air discharge opening with the forward wall of the second air discharge tube being positioned adjacent the rearward wall of the first air discharge tube. The second air discharge tube is radially offset with respect to the first air discharge tube. An elongated and rectangular-shaped third air discharge tube having an open upper end, an open lower end, a forward wall, a rearward wall, a first side wall and a second side wall is positioned rearwardly of the second air discharge tube with the third air discharge tube extending upwardly and laterally from the air discharge opening. The forward wall of the third air discharge tube is positioned adjacent the rearward wall of the second air discharge tube. The third air discharge tube is radially offset with respect to the second air discharge tube.

The air discharge tube assembly also includes an elongated and rectangular-shaped fourth discharge tube having an open lower end, an open upper end, a forward wall, a rearward wall, a first side wall and a second side wall. The fourth air discharge tube extends upwardly and laterally from the air discharge opening with the rearward wall of the fourth air discharge tube being positioned adjacent the forward wall of the first air discharge tube. The fourth air discharge tube is radially offset with respect to the first air discharge tube. The air discharge tube assembly also includes an elongated and rectangular-shaped fifth air discharge tube having an open upper end, an open lower end, a forward wall, a rearward wall, a first side wall and a second side wall. The fifth air discharge tube extends upwardly and laterally from the air discharge opening with the rearward wall of the fifth air discharge tube being positioned adjacent the forward wall of the fourth air discharge tube. The fifth air discharge tube is radially offset with respect to the fourth air discharge tube.

Spray nozzles are positioned in the first, second, third, fourth and fifth air discharge tubes at the upper ends thereof. The spray nozzles are in communication with a source of liquid chemicals under pressure. The blower is configured to be connected to a power source for powering the blower.

In a second embodiment of the invention, all of the air discharge tubes are aligned in a side-by-side relationship and are not radially offset with respect to one another. In another embodiment of the invention, there may be more than five air discharge tubes provided.

It is therefore a principal object of the invention to provide an improved mist blower.

A further object of the invention is to provide an improved mist blower which enables trees or the like on opposite sides of the blower to be simultaneously misted with an insecticide, pesticide, etc.

A further object of the invention is to provide a mist blower which includes a plurality of air discharge tubes which do not restrict air flow from the blower.

A further object of the invention is to provide a blower of the type described wherein each of the spray nozzles in each of the air discharge tubes may be individually shut-off while others continue to spray.

A further object of the invention is to provide a blower of the type described which provides maximum discharge efficiency.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
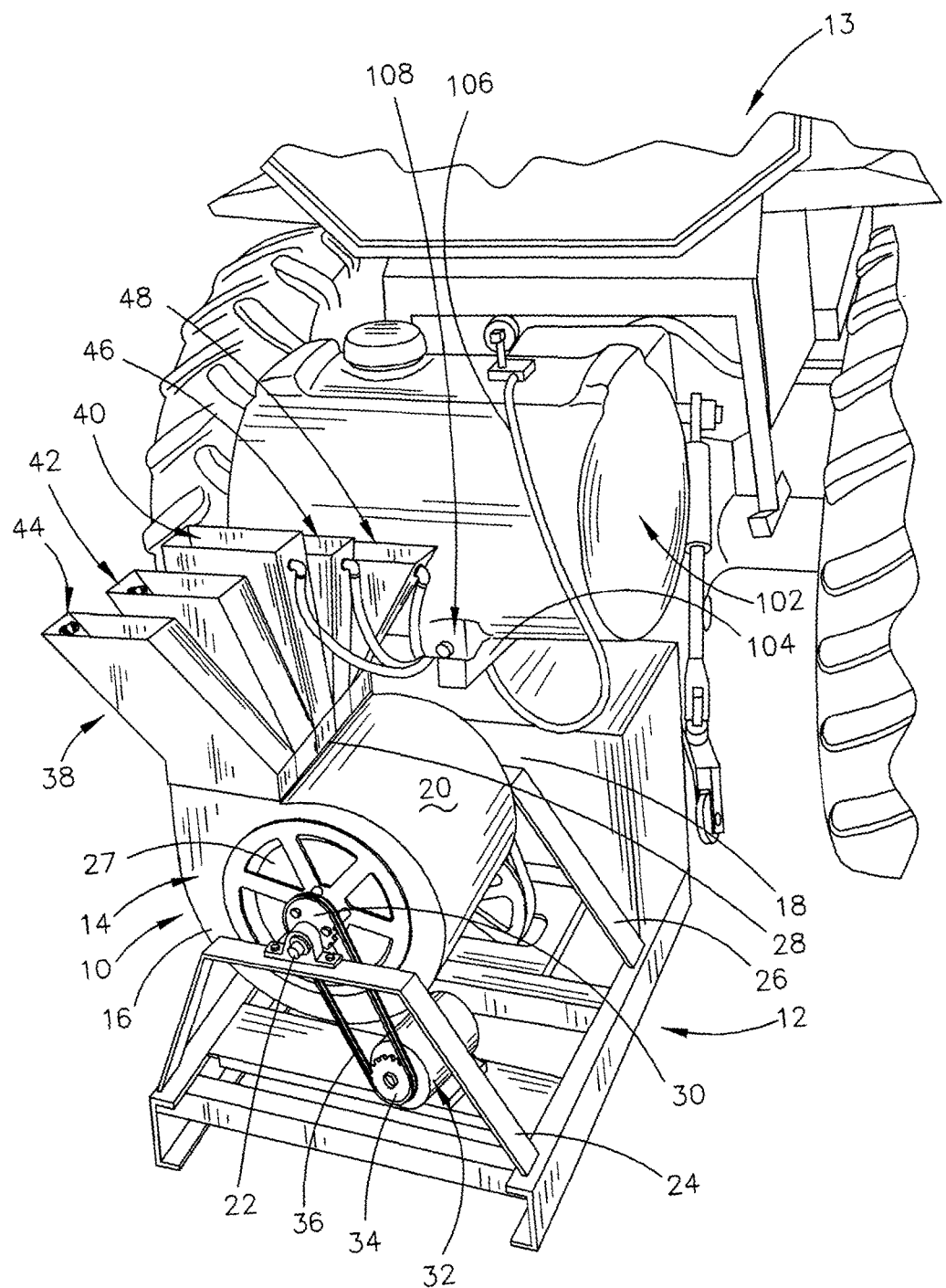
FIG. 1 is a rear perspective view of the mist blower of this invention mounted on the three-point hitch of a tractor.
Figure 2:
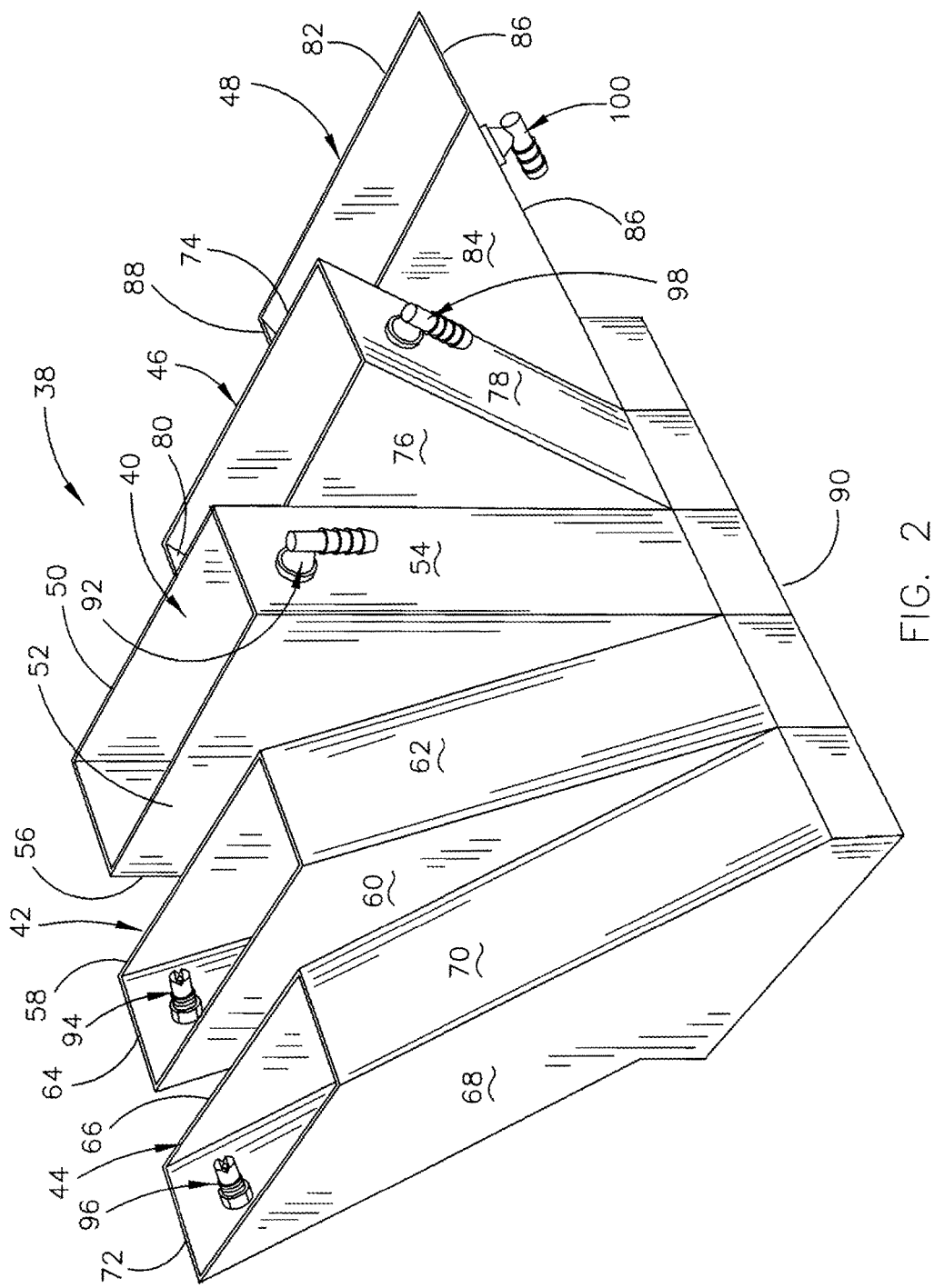
FIG. 2 is a perspective view of the air discharge tube assembly of this invention.
Figure 3:
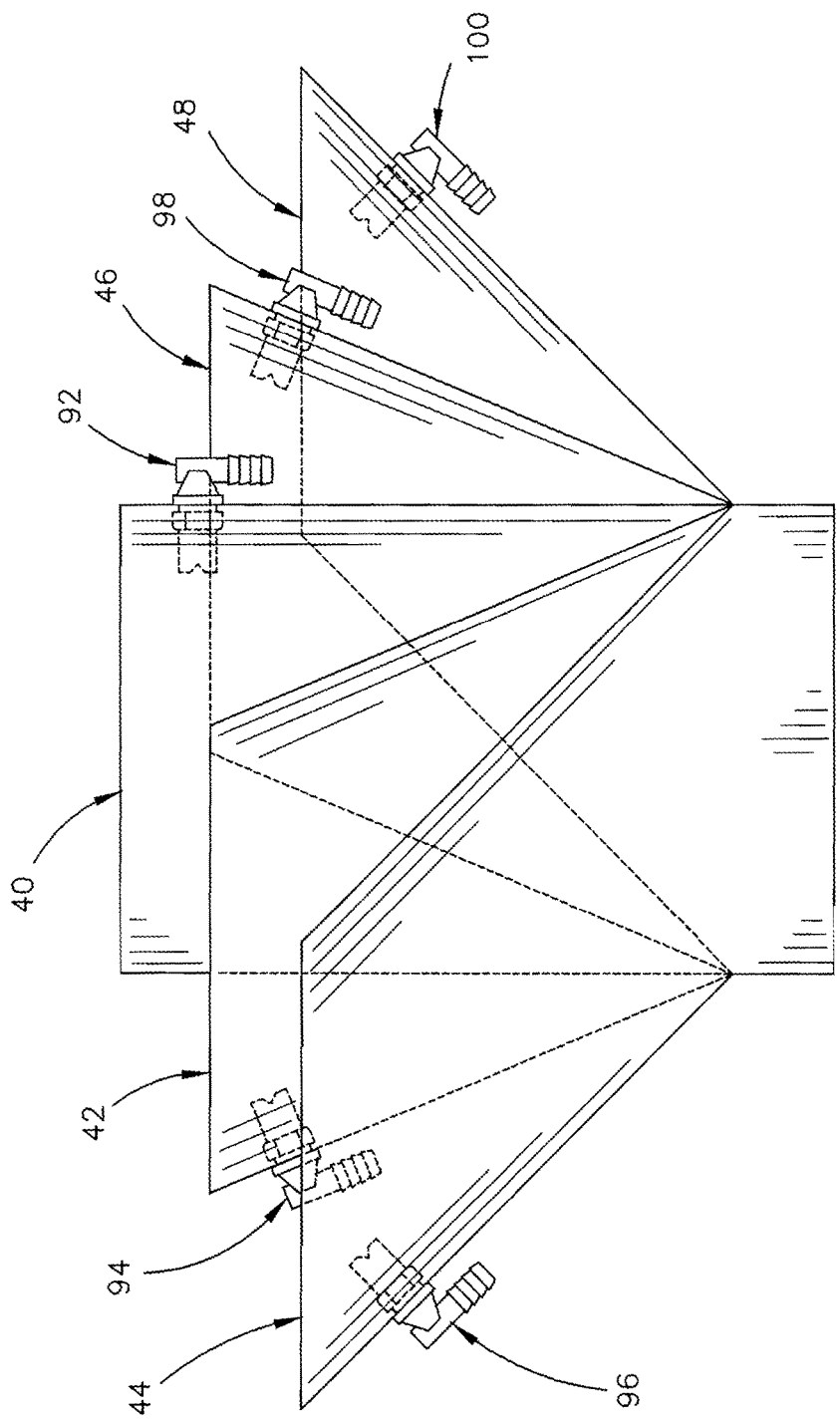
FIG. 3 is an end elevational view of the air discharge tube assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional mist blower except for the air discharge tubes thereof which will be described hereinafter. Blower 10 is usually mounted on a support frame or skid 12 which may be attached to a three-point hitch of a tractor 13 with the blower being driven by the PTO of the tractor. Frame 12 could also be mounted on a trailer with the blower 10 being driven by an engine. Frame 12 could also be mounted on an ATV, UTV, etc.

Blower 10 includes a blower housing or shroud 14 having a rearward end 16, a forward end 18, and a circular side wall 20. Both ends 16 and 18 will have an air inlet opening formed therein. The protruding ends of the drive shaft 22 of the blower 10 are rotatably mounted in bearings which are mounted on upstanding frame members 24 and 26 of frame 12. Blower 10 includes a centrifugal fan 27 in the interior of housing 14 in conventional fashion. Side wall 20 has a rectangular air discharge opening 28 formed therein.

A sprocket 30 is fixedly mounted on the rearward end 16 of housing 14. An electric or hydraulic motor 32 is mounted on frame 12 and has a sprocket 34 mounted on the drive shaft thereof in conventional fashion. Chain 36 extends around sprockets 30 and 34. Motor 32 is provided to selectively rotate housing 14 to enable the positioning of the air discharge opening 28 in various positions so that the misted air of the blower 10 may be directed to either side of the direction of travel of the tractor 13 or other prime mover, or directed upwardly as seen in FIG. 1.

The numeral 38 refers to the air discharge tube assembly of this invention. The air discharge tube assembly 38 includes hollow, elongated air discharge tubes 40, 42, 44, 46 and 48 which are hollow and which have open upper and lower ends. Although it is preferred that the air discharge tube assembly 38 includes five air discharge tubes, the assembly 38 would have less than five air discharge tubes or more than five air discharge tubes. Although it is preferred that the tube 42 have a shorter length than the tube 40 and that the tube 44 have a shorter length than tube 42, tubes 40, 42 and 44 could have the same lengths. Although it is preferred that tube 46 have a shorter length than tube 40 and that tube 48 have a shorter length than tube 46, tubes 40, 46, and 48 could have the same length. As seen, tubes 40, 42, 44, 46 and 48 have open upper ends. Tube 40 includes a front wall 50, a rear wall 52, a first side wall 54 and a second side wall 56. Tube 42 includes a front wall 58, a rear wall 60, a first side wall 62 and a second side wall 64. Tube 44 includes a front wall 66, a back wall 68, a first side wall 70 and a second side wall 72. Tube 46 includes a front wall 74, a rear wall 76, a first side wall 78 and a second side wall 80. Tube 48 includes a front wall 82, a rear wall 84, a first side wall 86 and a second side wall 88. The tubes 40, 42, 44, 46 and 48 may be constructed of a metal material such as steel, aluminum, etc. The tubes 40, 42, 44, 46 and 48 may also be comprised of a plastic material, wood, or other suitable materials.

If tubes 40, 42, 44, 46 and 48 are metal, the lower ends of the tubes 40, 42, 44, 46 and 48 will be joined together by welding to form a base 90 which is connected to side wall 20 or the discharge flange extending around discharge opening 28 so that the lower open ends of tubes 40, 42, 44, 46 and 48 are in communication with the air discharge opening 28. If the tubes 40, 42, 44, 46 and 48 are constructed of a material other than metal, the tubes 40, 42, 44, 46 and 48 will be joined together by any convenient means.

It is preferred that the tube 42 be radially offset with respect to tube 40 and that tube 44 be radially offset with respect to tube 42. It is also preferred that tube 46 be radially offset with respect to tube 40 and that tube 48 be radially offset with respect to tube 48. However, in some cases the tubes 40, 42, 44, 46 and 48 may be positioned so as to be parallel to one another. If the tubes 40, 42, 44, 46 and 48 are of metal construction, the first wall 58 is tack welded to the rear wall of tube 40 and the front wall 66 of tube 44 is tack welded to the rear wall 60 of tube 42. The rear wall 76 of tube 46 is tack welded to the front wall 50 of tube 40 and the rear wall 84 of tube 48 is tack welded to the front wall 74 of tube 40.

Although it is preferred that tubes 42, 44, 46 and 48 be radially offset with respect to the tube 40, they could be parallel to one another. Although it is preferred that air discharge tube 42 has a shorter length than tube 40 and that tube 44 has a shorter length than tube 42, tubes 42 and 44 could have the same lengths as tube 40. Although it is preferred that air discharge tube 46 have a shorter length than tube 40 and that tube 48 has a shorter length than tube 46, tubes 46 and 48 could have the same lengths as tube 40.

Spray nozzles 92, 94, 96, 98 and 100 are positioned in the air discharge tubes 40, 42, 44, 46 and 48 respectively to spray chemicals into the air being blown outwardly through the air discharge tubes. The numeral 102 refers to a tank or the like containing liquid chemicals. If only a water mist is being sprayed onto animals to cool them, the tank 102 will contain water. Tank 102 is connected to a power driven pump 104 by a hose, conduit or pipe 106. The discharge side of pump 104 is fluidly connected to controller 108 by a hose, conduit or pipe 110. Controller 108 is individually fluidly connected to spray nozzles 92, 94, 96, 98 and 100 by hoses 102, 104, 106, 108 and 110 respectively.

Figure 4:
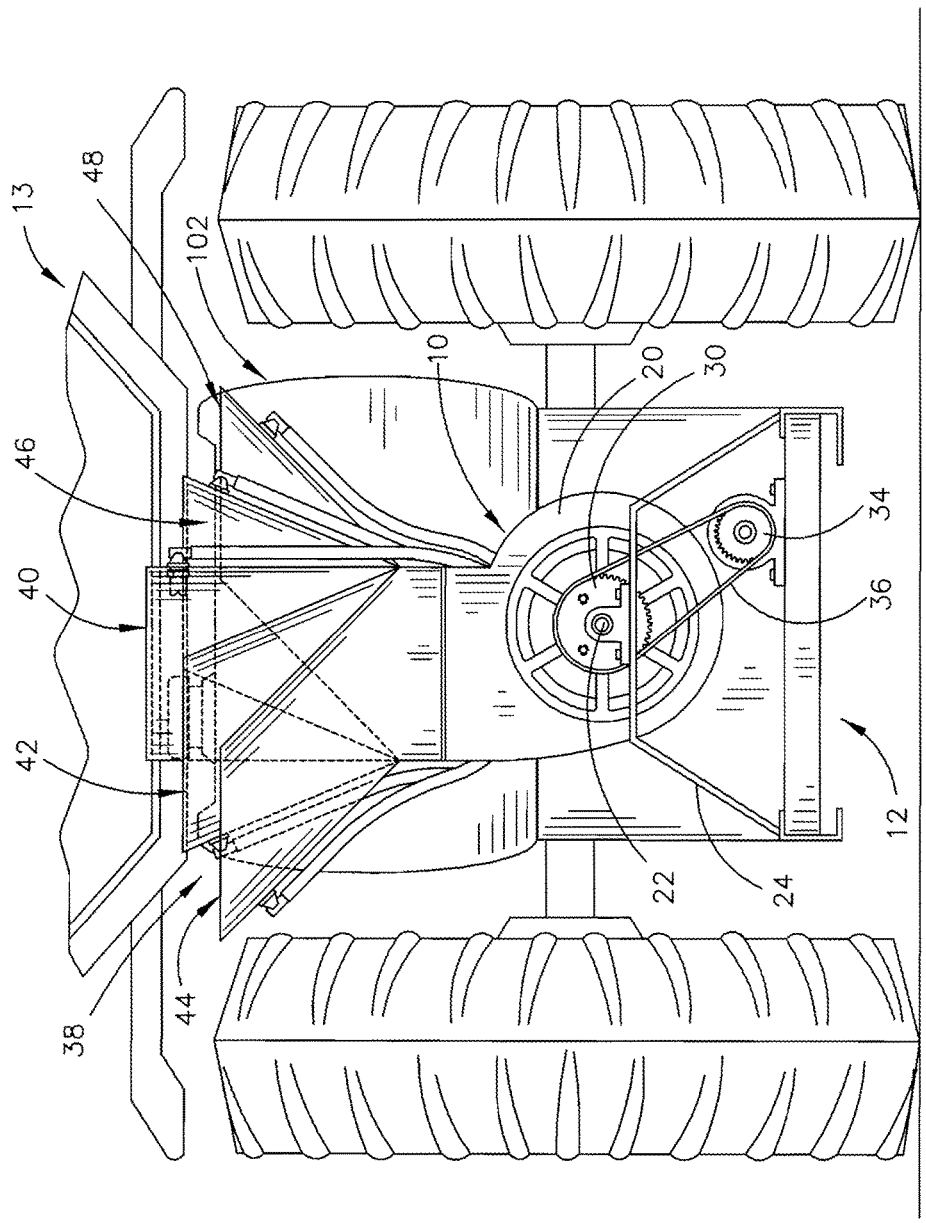
FIG. 4 is an end view of the mist blower of this invention mounted on the rear end of a tractor with the mist blower being in its normal operating position.
Figure 5:
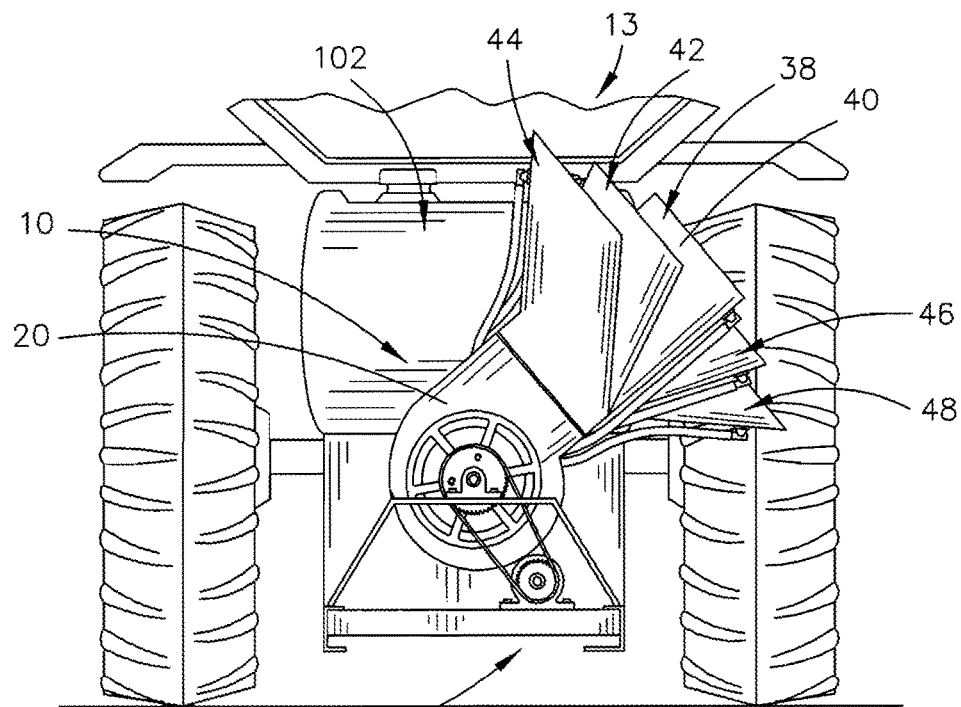
FIG. 5 is a view similar to FIG. 4 except that the mist blower has been rotated towards the right side of the tractor.
Figure 6:
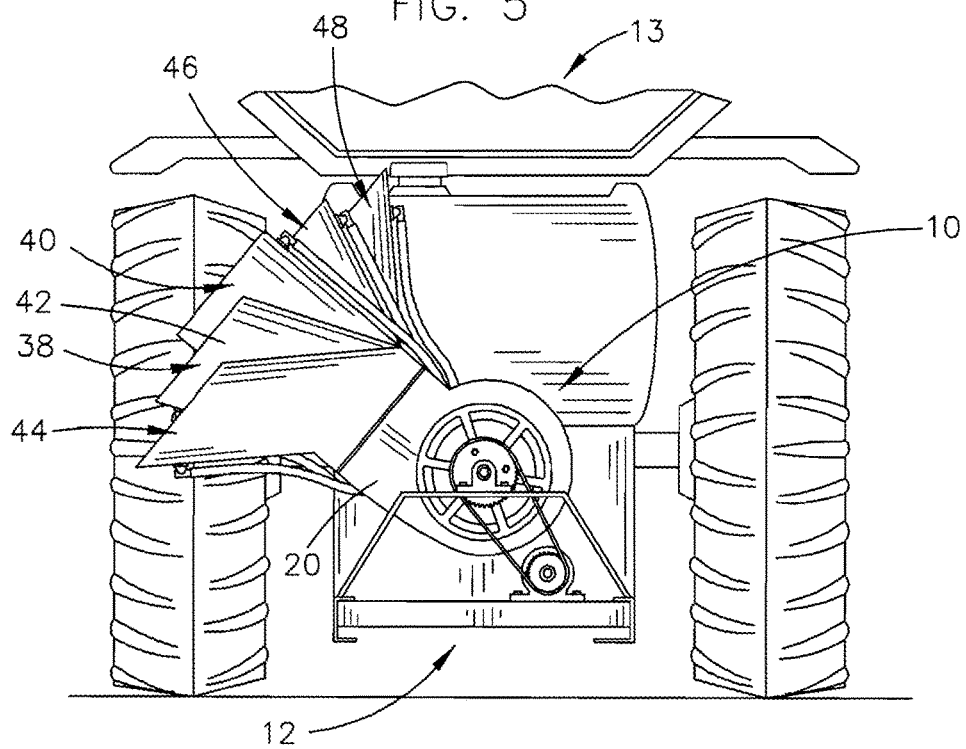
FIG. 6 is a view similar to FIG. 4 except that the mist blower has been rotated towards the left side of the tractor.
Figure 7:
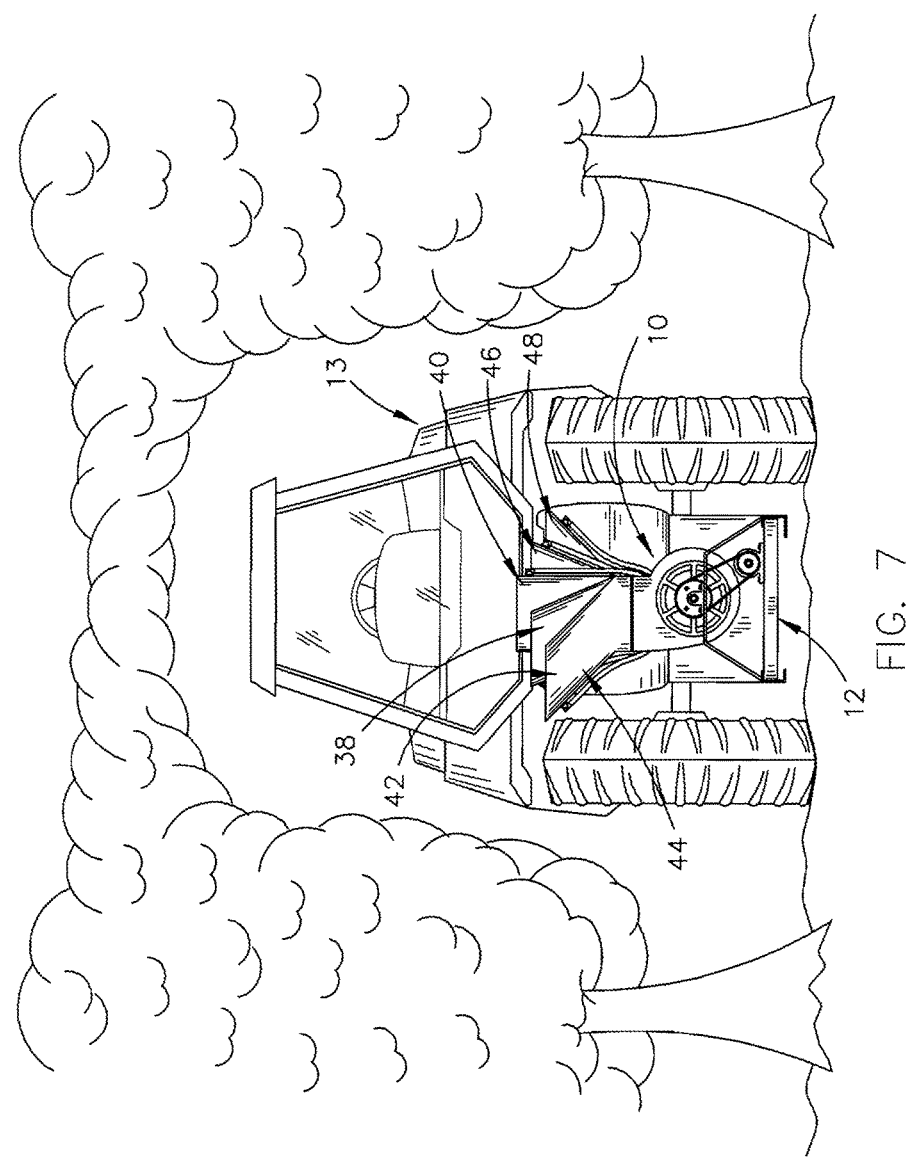
FIG. 7 is a view similar to FIG. 4 which shows the mist blower being in its normal operating position so as to blow mist chemicals to rows of trees at the sides of the tractor and blower and so as to blow mist chemicals upwardly onto the overlapping canopies of the two rows of trees.

Thus, when the blower 14 is in the position of FIGS. 1, 4 and 7, the tractor 13 may be driven between the rows of trees as seen in FIG. 7 so that the air discharge tube assembly will direct the misted air onto the trees at either side of the tractor 13 with the air discharge tubes 42 and 44 directing the misted air onto the trees at the left side of the tractor 13 with the air discharge tubes 46 and 48 directing the misted air onto the trees at the right side of the tractor 13. At the same time, tube 40 will direct misted air upwardly onto the intermingled canopies of the trees. Further, if there is no need to direct misted air upwardly from tube 40, the controller 108 will be controlled so that the spray nozzle 92 is inactive. Additionally, if only a single row of trees are to be sprayed, the spray nozzles 92, 94 and 96 or the spray nozzles 92, 98 and 100 may be deactivated by the controller 108.

Figure 8:
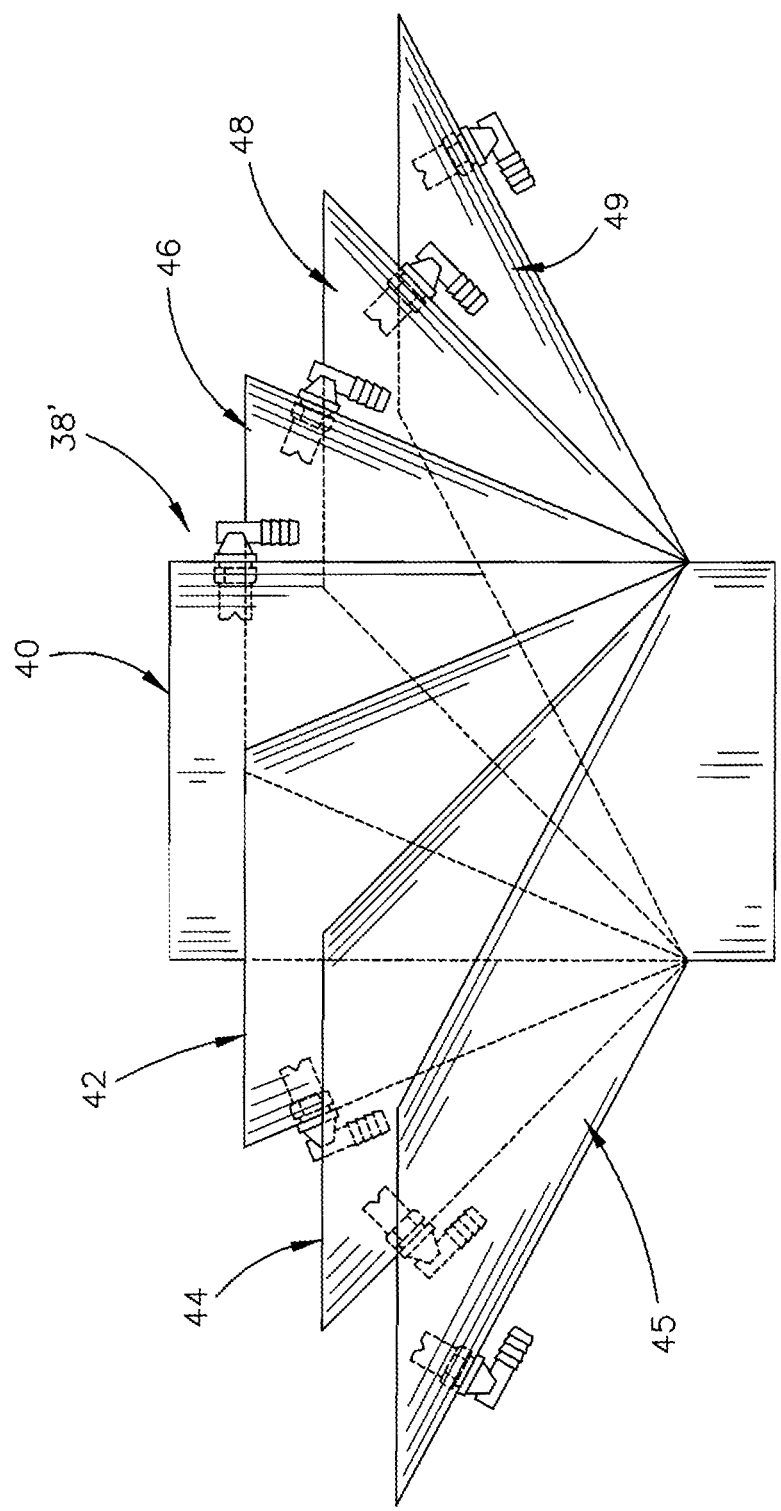
FIG. 8 is an end elevational view similar to FIG. 3 except that the air discharge tube assembly has seven air discharge tubes.
Figure 9:
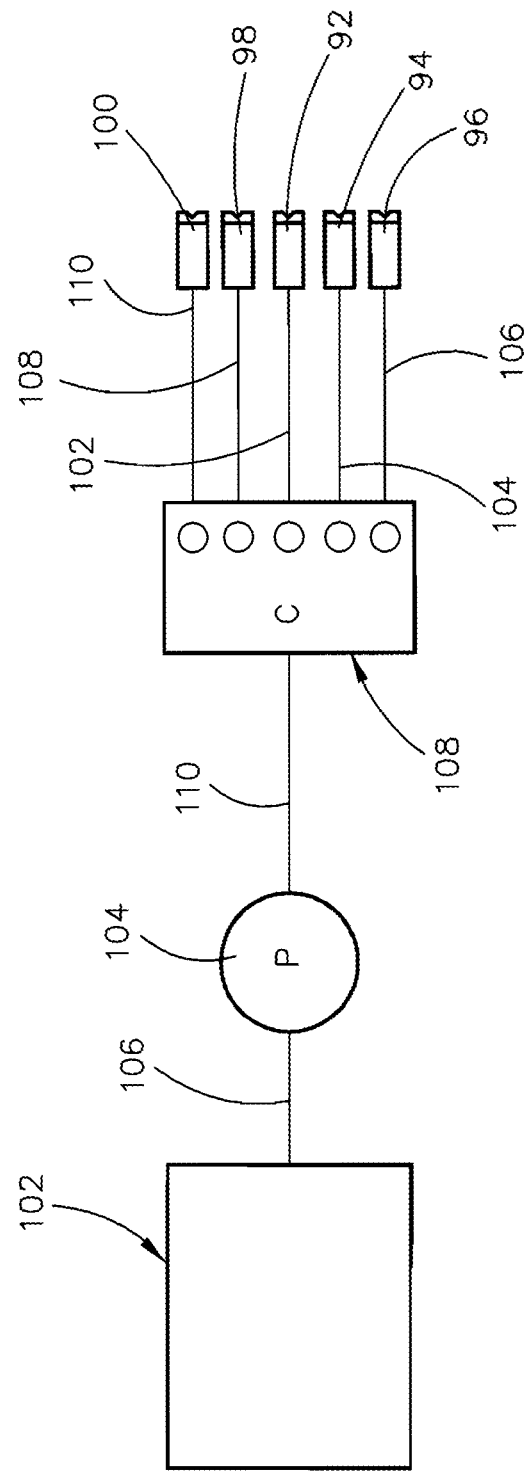
FIG. 9 is a schematic view illustrating the chemical tank, pump, controller and spray nozzles of the invention.

FIG. 8 illustrates an air discharge tube assembly 38' wherein seven air discharge tubes 40, 42, 44, 45, 46, 48 are utilized. Thus, the air discharge tube assembly may have any number of air discharge tubes. Further, the air discharge tube assembly may have less than five air discharge tubes.

It can therefore be seen that the mist blower 10 of this invention represents a vast improvement in the prior art.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A mist blower, comprising:
a mobile frame including forward and rearward upstanding and horizontally spaced-apart support frames having upper ends;
a centrifugal blower mounted on said upper ends of said forward and rearward support frames;
said blower including a blower housing having a forward end, a rearward end and a circular side wall;
said blower housing being horizontally disposed between said forward and rearward frames;
said side wall of said blower housing having a single horizontally extending and rectangular air discharge opening formed therein;
an air discharge tube assembly, having rearward and forward ends, secured to said blower housing at said air discharge opening formed in said blower housing;
said air discharge assembly including a hollow central air discharge tube having a rectangular air intake opening and a rectangular air discharge opening;
said central air discharge tube being fixed to said blower housing so that said air intake opening of said central air discharge tube is in communication with said air discharge opening in said blower housing;
said air discharge assembly also including at least one hollow forward air discharge tube having a rectangular air intake opening and a rectangular air discharge opening;
said at least one forward air discharge tube being fixed to said blower housing so that said air intake opening of said rearward air discharge tube is in communication with said air discharge opening in said blower housing;
said at least one forward air discharge tube being positioned forwardly of said central air discharge tube;
said air discharge assembly also including at least one hollow rearward air discharge tube having a rectangular air intake opening and a rectangular air discharge opening;
said at least one rearward air discharge tube being fixed to said blower housing so that said air intake opening of said at least one rearward air discharge tube is in communication with said air discharge opening in said blower housing;
said at least one rearward air discharge tube being positioned rearwardly of said central air discharge tube;
said at least one forward air discharge tube being radially offset with respect to said central air discharge tube in a first direction and being offset forwardly of said central air discharge tube;
said at least one rearward air discharge tube being radially offset with respect to central air discharge tube in a second direction which is opposite to said first direction and which is offset rearwardly of said central air discharge tube;
each of said central discharge tube, said at least one forward air discharge tube and said at least one rearward air discharge tube having a rectangular cross-section between said air intake opening and said rectangular air discharge opening thereof; and
a spray nozzle associated with each of said central air discharge tube, said at least one forward air discharge tube and said at least one rearward air discharge tube for injecting into the respective air discharge tube.

2. A mist blower, comprising:
a mobile frame including forward and rearward upstanding and horizontally spaced-apart support frames having upper ends;
a centrifugal blower mounted on said upper ends of said forward and rearward support frames;
said blower including a blower housing having a forward end, a rearward end and a circular side wall;
said blower housing being horizontally disposed between said forward and rearward frames;

said side wall of said blower housing having a single horizontally extending and rectangular air discharge opening formed therein;
an elongated and rectangular-shaped first air discharge tube having an open lower end, an open upper end, a forward wall, a rearward wall, a first side wall, and a second side wall;
said open lower end of said first air discharge tube being in communication with said air discharge opening at said forward end of said air discharge opening;
said first air discharge tube extending upwardly from said air discharge opening;
an elongated and rectangular-shaped second air discharge tube having an open lower end, an open upper end, a forward wall, a rearward wall, a first side wall and a second side wall;
said open lower end of said second air discharge tube being in communication with said air discharge opening rearwardly of said first air discharge tube;
said second air discharge tube extending upwardly from said air discharge opening;
said second air discharge tube being positioned rearwardly of said first air discharge tube;
said forward wall of said second air discharge tube being positioned adjacent said rearward wall of said first air discharge tube;
an elongated and rectangular-shaped third air discharge tube having an open upper end, an open lower end, a forward wall, a rearward wall, a first side wall, and a second side wall;
said open lower end of said third air discharge tube being in communication with said air discharge opening rearwardly of said second air discharge tube;
said third air discharge tube extending upwardly from said air discharge opening;
said third air discharge tube being positioned rearwardly of said second air discharge tube;
said forward wall of said third air discharge tube being positioned adjacent said rearward wall of said second air discharge tube;
an elongated and rectangular-shaped fourth air discharge tube having an open lower end, an open upper end, a forward wall, a rearward wall, a first side wall, and a second side wall;
said open lower end of said fourth air discharge tube being in communication with said air discharge opening rearwardly of said third air discharge tube;
said fourth air discharge tube extending upwardly from said air discharge opening;
said fourth air discharge tube being positioned rearwardly of said third air discharge tube;
said forward wall of said fourth air discharge tube being positioned adjacent said rearward wall of said third air discharge tube;
an elongated and rectangular-shaped fifth air discharge tube having an open upper end, an open lower end, a forward wall, a rearward wall, a first side wall, and a second side wall;
said open lower end of said fifth air discharge tube being in communication with said air discharge opening rearwardly of said fourth air discharge tube;
said fifth air discharge tube extending upwardly from said air discharge opening;
said fifth air discharge tube being positioned rearwardly of said fourth air discharge tube;
said forward wall of said fifth air discharge tube being positioned adjacent said rearward wall of said fourth air discharge tube;
each of said air discharge tubes having a rectangular cross-section between said rectangular air intake opening and said rectangular air discharge opening thereof;
when viewed from the rearward end of the mist blower, said second air discharge tube is radially offset from said first air discharge tube in a counterclockwise direction and is rearwardly offset from said first air discharge tube, said third air discharge tube is radially offset from said second air discharge tube in a counterclockwise direction and is rearwardly offset from said second air discharge tube, said fourth air discharge tube is radially offset from said third air discharge tube in a counterclockwise direction and is rearwardly offset from said third air discharge tube, said fifth air discharge tube is radially offset from said fourth air discharge tube in a counterclockwise direction and is rearwardly offset from said fourth air discharge tube;
a first spray nozzle positioned in said first air discharge tube at said upper end thereof;
a second spray nozzle positioned in said second air discharge tube at said upper end thereof;
a third spray nozzle positioned in said third air discharge tube at said upper end thereof;
a fourth spray nozzle positioned in said fourth air discharge tube at said upper end thereof;
a fifth spray nozzle positioned in said fifth air discharge tube at said upper end thereof;
said first, second, third, fourth and fifth spray nozzles being configured to be fluidly connected to a source of liquid under pressure; and
said blower being configured to be connected to a power source for powering said blower.

* * * * *